(12) United States Patent
Totsuka

(10) Patent No.: US 6,592,934 B2
(45) Date of Patent: *Jul. 15, 2003

(54) GAS DIFFUSION ELECTRODE, SOLID POLYMER ELECTROLYTE MEMBRANE, PROCESS FOR THE PRODUCTION THEREOF AND SOLID POLYMER ELECTROLYTE FUEL CELL

(75) Inventor: Kazuhide Totsuka, Kyoto (JP)

(73) Assignee: Japan Storage Battery Co., Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,850

(22) PCT Filed: Dec. 26, 1997

(86) PCT No.: PCT/JP97/04911

§ 371 (c)(1),
(2), (4) Date: Jun. 28, 1999

(87) PCT Pub. No.: WO98/29916

PCT Pub. Date: Jul. 9, 1998

(65) Prior Publication Data

US 2002/0004159 A1 Jan. 10, 2002

(30) Foreign Application Priority Data

Dec. 27, 1996 (JP) .............................. 8-357974

(51) Int. Cl.$^7$ ................................ H01M 8/10
(52) U.S. Cl. ..................... 427/115; 429/30; 429/40; 429/41
(58) Field of Search ............................. 429/30, 33, 40, 429/41; 502/4, 11, 527.19, 508; 427/115; 29/623.5

(56) References Cited

U.S. PATENT DOCUMENTS

| | | | | |
|---|---|---|---|---|
| 4,849,311 A | * | 7/1989 | Itoh et al. | 429/317 |
| 5,084,144 A | * | 1/1992 | Reddy et al. | 204/104 |
| 5,441,822 A | * | 8/1995 | Yamashita et al. | 429/34 |
| 5,474,857 A | * | 12/1995 | Uchida et al. | 429/33 |
| 5,500,292 A | * | 3/1996 | Muranaka et al. | 429/33 |
| 5,683,828 A | * | 11/1997 | Spear et al. | 429/13 |
| 5,929,594 A | * | 7/1999 | Nonobe et al. | 320/104 |
| 6,054,230 A | * | 4/2000 | Kato | 429/33 |
| 6,248,469 B1 | * | 6/2001 | Formato et al. | 429/41 |

FOREIGN PATENT DOCUMENTS

| | | | | |
|---|---|---|---|---|
| JP | 58-7423 | | 1/1983 | |
| JP | 62-61118 B | | 12/1987 | |
| JP | 62-61119 B | | 12/1987 | |
| JP | 2-48632 B | | 10/1990 | |
| JP | 4-162365 | | 6/1992 | |
| JP | 4-169069 | | 6/1992 | |
| JP | 6-333574 | | 12/1994 | |
| JP | 07 176 310 A | * | 7/1995 | |
| JP | 7-183035 | | 7/1995 | |
| JP | 08 148 153 A | * | 6/1996 | |

* cited by examiner

*Primary Examiner*—Patrick Ryan
*Assistant Examiner*—Gregg Cantelmo
(74) *Attorney, Agent, or Firm*—Sughrue Mion, PLLC

(57) ABSTRACT

A gas diffusion electrode for solid polymer electrolyte fuel cell comprising a gas diffusion electrode and a catalyst layer, characterized in that the catalyst layer is provided with a catalytic substance and an ion exchange resin having pores. In this arrangement, a three-phase boundary can be provided also inside the catalyst layer while maintaining sufficient electron conductivity, capability of supplying reaction gas and protonic conductance, making it possible to enhance the polarization characteristics and power density.

9 Claims, 6 Drawing Sheets

5 μm

5 μm

5 μm

5 µm

GAS DIFFUSION ELECTRODE, SOLID POLYMER ELECTROLYTE MEMBRANE, PROCESS FOR THE PRODUCTION THEREOF AND SOLID POLYMER ELECTROLYTE FUEL CELL

TECHNICAL FIELD

The present invention relates to a solid polymer electrolyte fuel cell.

BACKGROUND ART

A solid polymer electrolyte fuel cell has a structure comprising a gas diffusion electrode provided on both surfaces of an ion exchange membrane (solid polymer electrolyte). This is an apparatus which allows the electrochemical reaction of an oxidizing agent such as oxygen with a fuel such as hydrogen to give electric power.

A gas diffusion electrode comprises a catalyst layer and a gas diffusion layer. The catalyst layer is formed by binding a catalyst such as particulate noble metal and/or carbon powder having a particulate noble metal supported thereon with a binder or the like. As such a binder a fluorinic resin such as polytetrafluoroethylene (PTFE) is normally used. This fluorinic resin is also a water repellent which renders a catalyst layer properly water-repellent. As a gas diffusion layer a water repellent carbon paper or the like is used.

The characteristics of such a solid polymer electrolyte fuel cell drastically depend on the structure of the gas diffusion electrode, particularly the catalyst layer. In other words, the electrode reaction proceeds on a three-phase boundary where the catalyst in the catalyst layer, the electrolyte and oxygen or hydrogen are present. However, since this type of a fuel cell comprises a solid material as the electrolyte, this three-phase boundary is limited to a two-dimensional boundary of electrolyte with catalyst layer, lowering the activity of the gas diffusion electrode. Attempts have been made so far to enhance the activity of gas diffusion electrodes by various methods for increasing the three-phase boundary.

One of these methods is to increase the surface of solid polymer electrolyte membrane and hence its area of contact with a catalyst. For example, JP-A-58-7423 (The term "JP-A" as used herein means an "unexamined published Japanese patent application") proposes a process for the production of a porous polymer electrolyte membrane. However, the above cited patent application has no reference to effects and characteristics developed when this production method is applied to fuel cell. Further, JP-A-4-169069 proposes a method involving the roughening of the surface of a solid polymer electrolyte membrane by sputtering or like means.

Another method is to incorporate an ion exchange resin in a catalyst layer and hence increase its area of contact with a catalyst. For example, JP-B-62-61118 (The term "JP-A" as used herein means an "unexamined published Japanese patent application") and JP-B-62-61119 propose a method which comprises the preparation of a catalyst layer from a mixture obtained by adding an ion exchange resin solution to a catalytic substance. JP-A-4-162365 employs a method involving the coating of the surface of a catalytic substance by an ion exchange resin solution. JP-B-2-48632 and JP-A-6-333574 propose a method which comprises spraying or applying an ion exchange resin solution to a catalyst layer, and then drying the catalyst layer to provide the catalyst layer with an ion exchange resin. Further, JP-A-7-183035 proposes a method which allows a catalytic substance to adsorb an ion exchange resin colloid.

On the other hand, another factor affecting the characteristics of a solid polymer electrolyte fuel cell is the electrical conductance of the solid polymer electrolyte membrane. In other words, in order to enhance the power of a solid polymer electrolyte fuel cell, it is important to lower the resistance of solid polymer electrolyte membrane. To this end, a method involving the provision of a solid polymer electrolyte membrane having a reduced thickness or a method involving the increase of the amount of sulfonic group incorporated in ion exchange resin has been proposed.

Although the foregoing conventional methods can increase the surface area of the ion exchange resin membrane in the catalyst layer itself, it can hardly fill the pores in the catalyst layer or the valleys of unevenness on the catalyst layer with a catalytic substance such as particulate carbon having a particulate noble metal catalyst supported thereon. Thus, it is extremely difficult to increase the three-phase boundary by these methods.

Further, a method is disclosed which comprises covering a catalytic substance such as particulate carbon having a particulate noble metal catalyst supported thereon to form a catalyst layer having an increased contact area and hence an increased three-phase boundary as mentioned above. In this case, it is indispensable to leave the catalytic substance partly uncovered by using a water repellent such as PTFE to improve the properties of fuel cell or form a uniform thin coating film to enhance the gas permeability thereof. If a portion left uncovered is formed, a portion which is excessively covered or entirely uncovered due to the positional relationship between catalytic substances is formed, lowering the gas permeability or making it impossible to obtain the desired activity. Accordingly, the resulting fuel cell exhibits deteriorated properties. Further, if the method involving the formation of a uniform thin coating film is employed, it is extremely difficult to form such a uniform thin coating film, deteriorating the productivity. In addition, if the thickness of the coating film is reduced, the path of migration of proton is remarkably reduced, deteriorating the properties of the fuel cell.

In addition, if the thickness of the coating film is reduced, the path of migration of proton is remarkably reduced, deteriorating the properties of the fuel cell.

Therefore, the present invention has been worked out to give a solution to the foregoing prior art problems. An object of the present invention is to provide a gas diffusion electrode and a solid polymer electrolyte which increase the three-phase boundary in the catalyst layer while sufficiently securing the path of migration of substances such as oxygen, hydrogen and produced water all over the catalyst layer and the catalytic substance without deteriorating the ionic conductivity thereof in a solid polymer electrolyte fuel cell. Another object of this invention is a high power solid polymer electrolyte fuel cell comprising the gas diffusion electrode and solid polymer electrolyte. Another object of the present invention is to provide a process for the production of a gas diffusion electrode which can also secure electrical contact with a catalytic substance.

DISCLOSURE OF THE INVENTION

The foregoing objects of the present invention are accomplished by the following inventions.

The first invention concerns a gas diffusion electrode for a solid polymer electrolyte fuel cell comprising a gas diffusion layer and a catalyst layer, characterized in that said catalyst layer is provided with a catalytic substance and an ion exchange resin having pores.

The second invention concerns a gas diffusion electrode for a solid polymer electrolyte fuel cell comprising a gas diffusion layer and a catalyst layer, characterized in that said catalyst layer is provided with an ion exchange resin having pores having a diameter of from 0.05 to 5.0 µm and porosity of not less than 40%.

The third invention concerns a gas diffusion electrode for solid polymer electrolyte fuel cell comprising a gas diffusion layer and a catalyst layer, characterized in that said ion exchange resin is a perfluorosulfonic acid resin and said catalytic substance is or comprises a particulate noble metal or carbon having a particulate noble metal supported thereon.

The fourth invention, which is according to the first, second or third invention, concerns a process comprising forming an ion exchange resin coating film, made of a solution obtained by dissolving an ion exchange resin in a solvent containing an alcohol, on a catalyst layer precursor with the ion exchange resin coating film on it in an organic solvent having a polar group other than alcoholic hydroxyl group so that the ion exchange resin is solidified and rendered porous. In the present invention, the coating film may be in the form of a membrane or may comprise a catalytic substance incorporated in an ion exchange resin. To be short, it suffices if the ion exchange resin is present around the catalytic substance.

The fifth invention concerns a solid polymer electrolyte membrane-gas diffusion electrode assembly comprising a gas diffusion electrode for a solid polymer electrolyte fuel cell according to any one of the first to third inventions provided on at least one side of a solid polymer electrolyte membrane.

The sixth invention concerns a solid polymer electrolyte fuel cell comprising a solid polymer electrolyte membrane-gas diffusion electrode assembly according to the fifth invention.

The seventh invention concerns a solid polymer electrolyte membrane comprising an ion exchange resin as a constituent and having pores.

The eighth invention concerns a solid polymer electrolyte membrane according to the seventh invention, wherein said solid polymer electrolyte membrane has a pore diameter of from 0.02 to 1.0 µm and a porosity of not less than 10%.

The ninth invention concerns a solid polymer electrolyte membrane according to the seventh or eighth invention, wherein said ion exchange resin is a perfluorosulfonic acid resin.

The tenth invention, which is according to the seventh, eighth or ninth invention, concerns a process for the production of a solid polymer electrolyte membrane which comprises soaking a solution comprising an ion exchange resin dissolved in a solvent containing an alcohol in an organic solvent having a polar group other than an alcoholic hydroxyl group so that said ion exchange resin is solidified and rendered porous to form an ion exchange resin membrane having pores.

The eleventh invention concerns a solid polymer electrolyte fuel cell comprising a solid polymer electrolyte membrane according to the seventh, eighth or ninth invention.

BRIEF DESCRIPTION OF THE DRAWINGS

In FIGS. 4 and 5, the reference numeral 1 indicates an ion exchange resin having pores, the reference numeral 2 indicates a carbon-supported platinum catalyst, the reference numeral 3 indicates a polytetrafluoroethylene (binder), the reference numeral 4 indicates a gas diffusion layer, the reference numeral 5 indicates a catalyst layer numeral 6 indicates the gas diffusion electrode, the reference numeral 7 indicates a solid polymer electrolyte membrane, the reference numeral 8 indicates a void, the reference numeral 9 indicates a solid polymer electrolyte membrane-gas diffusion electrode assembly, and the reference numeral 11 indicates a pore.

Best Embodiments of Implication of the Invention

A process for the production of this electrode will be described hereinafter. In other words, a solution comprising an ion exchange resin dissolved in a solvent containing an alcohol is soaked in an organic solvent having a polar group other than alcoholic hydroxyl group such as butyl acetate so that the ion exchange resin dissolved therein is solidified and rendered porous.

As the ion exchange resin solution there may be used a 5 wt-% Nafion solution (produced by Aldrich Inc. of USA), which is a commercially available perfluorosulfonic acid resin solution. This Nafion solution may be partly concentrated to give various concentrations. The Nafion solution which has been thus adjusted in concentration is applied to a glass plate which is then soaked in butyl acetate and allowed to stand. The glass plate is then allowed to dry at room temperature to form an ion exchange resin coating film having pores thereon. Nafion is a registered trademark of Du Pont Inc.

Figure 1:
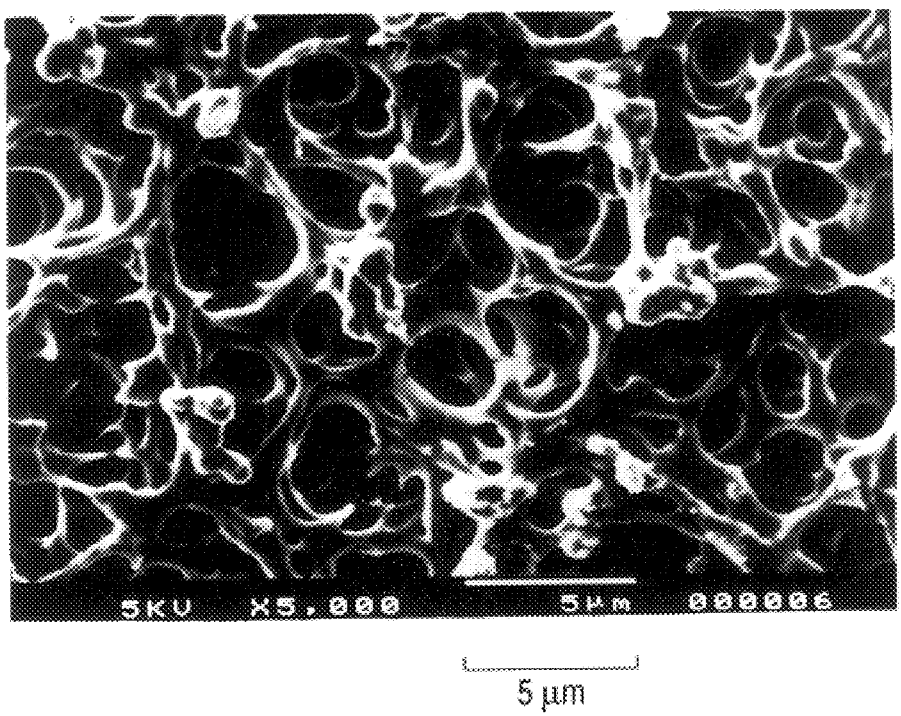
FIG. 1 is an electron microphotograph illustrating the surface conditions of an ion exchange resin having pores according to the present invention.
Figure 2:
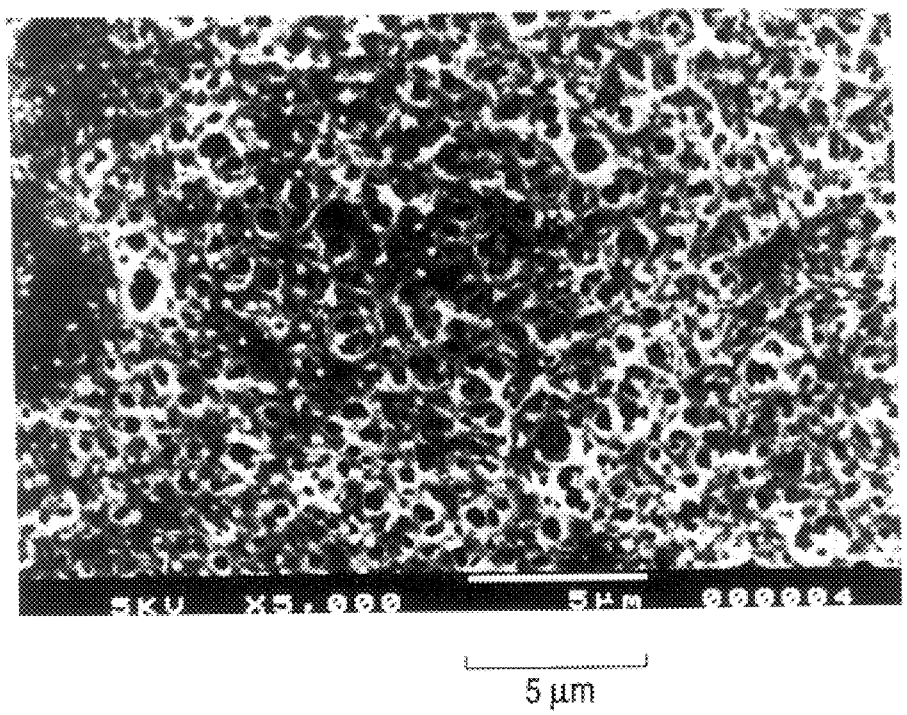
FIG. 2 is an electron microphotograph illustrating the surface conditions of another ion exchange resin having pores according to the present invention.

FIGS. 1 and 2 each are diagrams (electron microphotograph) illustrating the surface conditions of an ion exchange resin having pores thus prepared from a 9 wt-% Nafion solution and a 13 wt-% Nafion solution, respectively.

As can be seen in both the two drawings, this is a porous ion exchange resin having a three-dimensional network structure in which continuous pores are formed. The diameter of the pores thus formed or the porosity of the porous ion exchange resin varies with the concentration of the ion exchange resin solution. In other words, the higher the concentration of the ion exchange resin solution is, the smaller are the diameter of the pores thus formed and the porosity of the porous ion exchange resin. On the contrary, the lower the concentration of the ion exchange resin solution is, the greater are the diameter of the pores thus formed and the porosity of the porous ion exchange resin.

By using this process, the gas diffusion electrode according to the present invention can be prepared. In other words, a powder layer made of a catalytic substance alone or a material obtained by binding a particulate catalytic substance with a binder, i.e., catalyst layer precursor is prepared. This catalyst layer precursor, e.g., material obtained by binding a particulate catalytic substance with a binder is then soaked in a solution obtained by dissolving an ion exchange resin in a solvent containing an alcohol. Alternatively, this solution is applied to the surface of the catalyst layer precursor. Thus, a coating layer is formed on the catalyst layer precursor. The catalyst layer precursor is then soaked in an organic solvent having a polar group other than alcoholic hydroxyl group such as butyl acetate so that the ion exchange resin thus coated is solidified and rendered porous to form an ion exchange resin having pores open to the catalytic substance in the catalyst layer. If the catalyst layer precursor is a catalyst powder layer, the foregoing solution is allowed to penetrate into the powder layer to form a coating membrane. The coating film made of this ion exchange resin solution may be in the form of membrane or may comprise a catalytic substance incorporated in an ion exchange resin.

As the organic solvent having a polar group other than alcoholic hydroxyl group there may be used an organic solvent having a $C_{1-7}$ carbon chain having an ester group in its molecule such as propyl formate, butyl formate, isobutyl formate, ethyl acetate, propyl acetate, isopropyl acetate, allyl acetate, butyl acetate, isobutyl acetate, pentyl acetate, isopentyl acetate, methyl propionate, ethyl propionate, propyl propionate, methyl acrylate, butyl acrylate, isobutyl acrylate, methyl butyrate, isopropyl isobutyrate, 2-ethoxyethyl acetate and 2-(2-ethoxyethoxy) ethyl acetate, singly or in admixture, an organic solvent having a $C_{3-5}$ carbon chain having an ether group in its molecule such as dipropyl ether, dibutyl ether, ethylene glycol dimethyl ether, ethylene glycol diethyl ether, tripropylene glycol monomethyl ether and tetrahydrofuran, singly or in admixture, an organic solvent having a $C_{4-8}$ carbon chain having a ketone group in its molecule such as methyl butyl ketone, methyl isobutyl ketone, methyl hexyl ketone and dipropyl ketone, singly or in admixture, an organic solvent having a $C_{1-5}$ carbon chain having an amine group in its molecule such as isopropylamine, isobutylamine, tertiary butylamine, isopentylamine and diethylamine, singly or in admixture or an organic solvent having a $C_{1-6}$ carbon chain having a carboxyl group in its molecule such as propionic acid, valeric acid, caproic acid and heptanoic acid, singly or in admixture.

The perfluorosulfonic acid resin solution has been described with reference to commercially available Nafion solution. However, the present invention is not limited to this Nafion solution. Any perfluorosulfonic acid solution may be used.

A second process for the production of the gas diffusion electrode will be described hereinafter.

A mixed dispersion of an ion exchange resin solution with a solution of a second polymer compound incompatible therewith is prepared. The mixed dispersion is then applied to a catalyst layer precursor formed by constituents such as catalytic substance and binder, e.g., by coating the catalyst layer precursor with the mixed dispersion. The catalyst layer precursor is then dried so that the solvent is removed from the mixed dispersion to form a coating film having the ion exchange resin and the second polymer compound in phase-separated state. The coating film thus phase-separated is then dipped in a solvent which cannot dissolve the ion exchange resin but dissolves the second polymer compound therein so that the second polymer compound is eluted. Thus, pores are formed where the second polymer compound is eluted. In this manner, an ion exchange resin having pores in a catalyst layer is formed.

Figure 4:
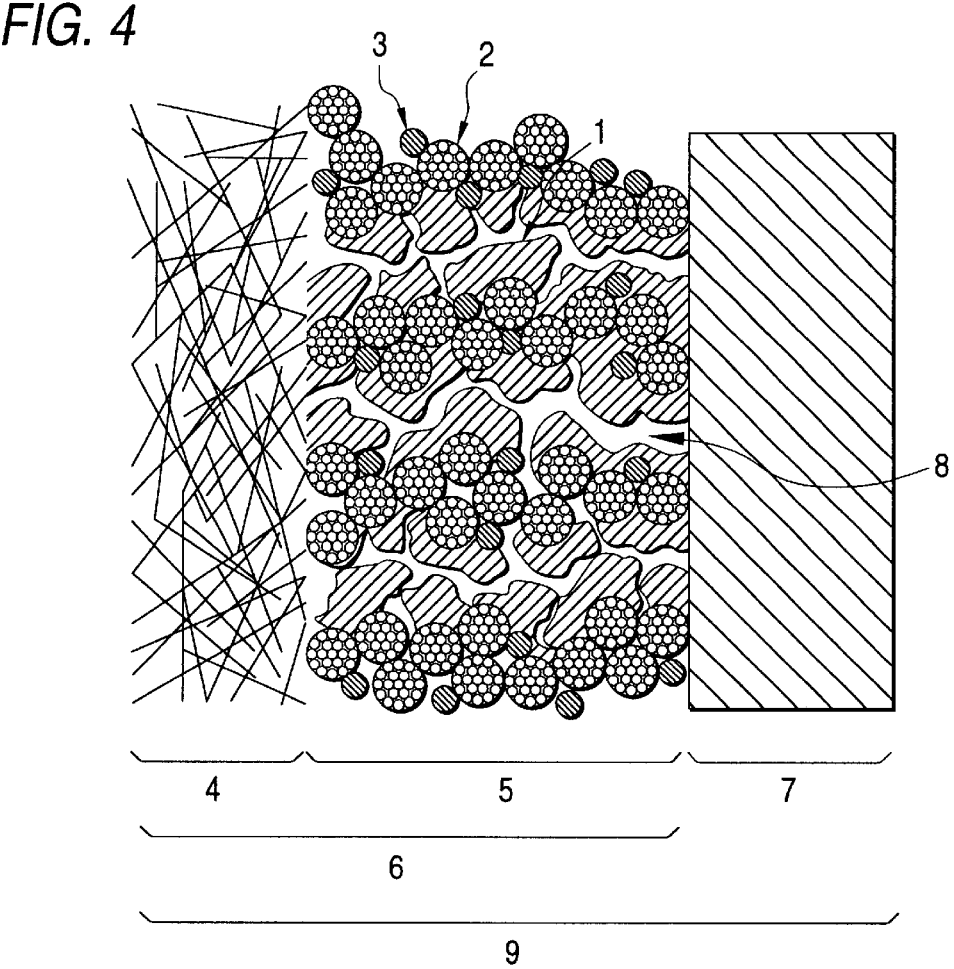
FIG. 4 is a specific sectional view of a solid polymer electrolyte-gas diffusion electrode assembly according to the present invention.

A schematic sectional view of a solid polymer electrolyte membrane-gas diffusion electrode assembly of the present invention provided with an ion exchange resin having pores in a catalyst layer is shown in FIG. 4. In this diagram, the reference numeral 1 indicates an ion exchange resin having pores. The reference numeral 2 indicates a catalytic substance which is a carbon-supported platinum catalyst having a particulate noble metal such as particulate platinum supported as a catalyst on a particulate carbon. The reference numeral 3 indicates a polytetrafluoroethylene as a binder. The reference numeral 5 indicates a catalyst layer formed by a carbon-supported platinum catalyst 2, a binder 3 and an ion exchange resin 1 having pores.

Formed in the structure formed by the carbon-supported platinum catalyst 2 and the binder 3 in the catalyst layer, 5 are voids 8. The carbon-supported platinum catalyst 2 is provided with an ion exchange resin 1 having pores on the surface thereof. The reference numeral 4 indicates a gas diffusion layer which is a carbon paper provided with water repellency. The gas diffusion electrode 6 is formed by the gas diffusion layer 4 and the catalyst layer 5. The reference numeral 7 indicates an ion exchange membrane which is a solid polymer electrolyte membrane. The gas diffusion electrode 6 is bonded to the ion exchange membrane 7 to form a solid polymer electrolyte membrane-gas diffusion electrode assembly 9.

Figure 5:
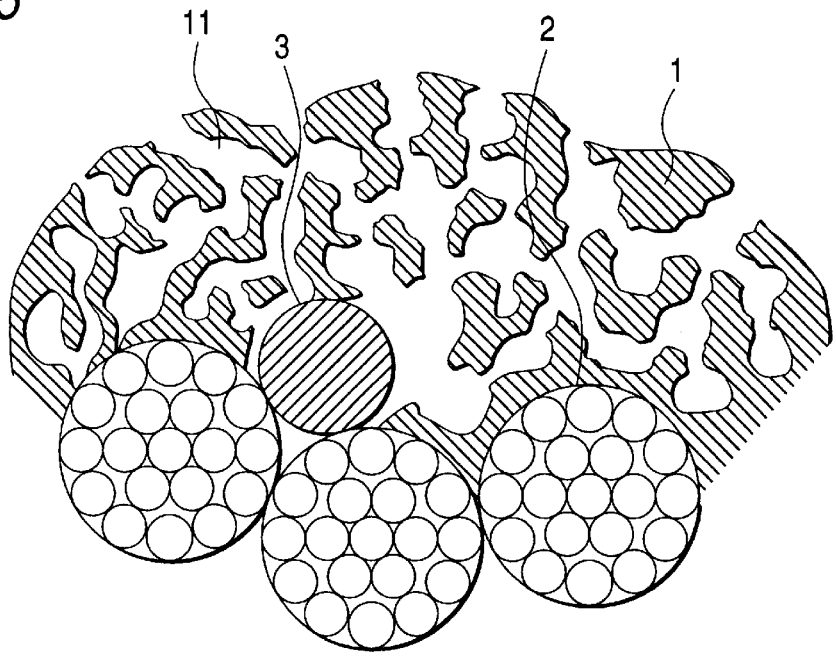
FIG. 5 is a specific sectional view of an ion exchange resin 1 having pores according to the present invention.

FIG. 5 is an enlarged view illustrating a schematic section of the ion exchange resin 1 having pores of FIG. 4. Formed on the carbon-supported platinum catalyst 2 is the ion exchange resin 1 having three-dimensional network pores shown by the electron microphotograph illustrating surface conditions in FIG. 1.

Referring to the process for the production of a gas diffusion electrode according to the present invention, a process is preferably used which comprises forming a coating film of an ion exchange resin 1 on a catalyst layer precursor previously formed by a carbon-supported platinum catalyst 2 and a binder 3, and then forming three-dimensional pores therein. In this manner, the carbon-supported platinum catalyst particles come in contact with each other with no ion exchange resin present interposed therebetween, making it possible to keep sufficient electrical contact between the carbon-supported platinum catalyst particles while forming a sufficient path of migration of electrons in the catalyst layer. Further, since the ion exchange resin has pores, the carbon-supported platinum catalyst is not excessively covered. Moreover, since these pores are continuous, the resulting catalyst layer exhibits a high gas permeability that facilitates the supply of a gas such as oxygen or hydrogen to the catalyst portion. Further, since the ion exchange resin has a continuous three-dimensional network structure, a sufficient path of migration of proton is formed.

Thus, sufficient electronic conduction, supply of reaction gas and protonic conduction can be provided, and a three-phase boundary can be formed deep into the catalyst layer.

Accordingly, reactions represented by the following formulae can proceed also inside the catalyst layer. Thus, the substantial reaction area can be increased, making it possible to obtain a gas diffusion electrode having a high activity. On the anode:

$$2H_2 \rightarrow 4H^+ + 4e^-$$

On the cathode:

$$O_2 + 4H^+ + 4e^- \rightarrow 2H_2O$$

In addition, as can be seen in the following examples, the effect of the present invention can be exerted remarkably because of the high conductance of the ion exchange resin having pores.

(Experiment 1)

An ion exchange resin having pores according to the present invention was prepared. The ion exchange resin thus prepared was then measured for conductance.

A 5 wt-% Nafion solution, which is a commercially available perfluorosulfonic acid resin solution, was heated to a temperature of 60° C. with stirring so that the solvent was removed to prepare 9 wt-%, 13 wt-% and 21 wt-% Nafion solutions.

The 9 wt-% Nafion solution was then applied to a glass plate through a 300# (mesh) screen. The 13 wt-% and 21 wt-% Nafion solutions were then each applied to a glass plate using a doctor blade with a gap adjusted to 0.1 mm.

Figure 3:
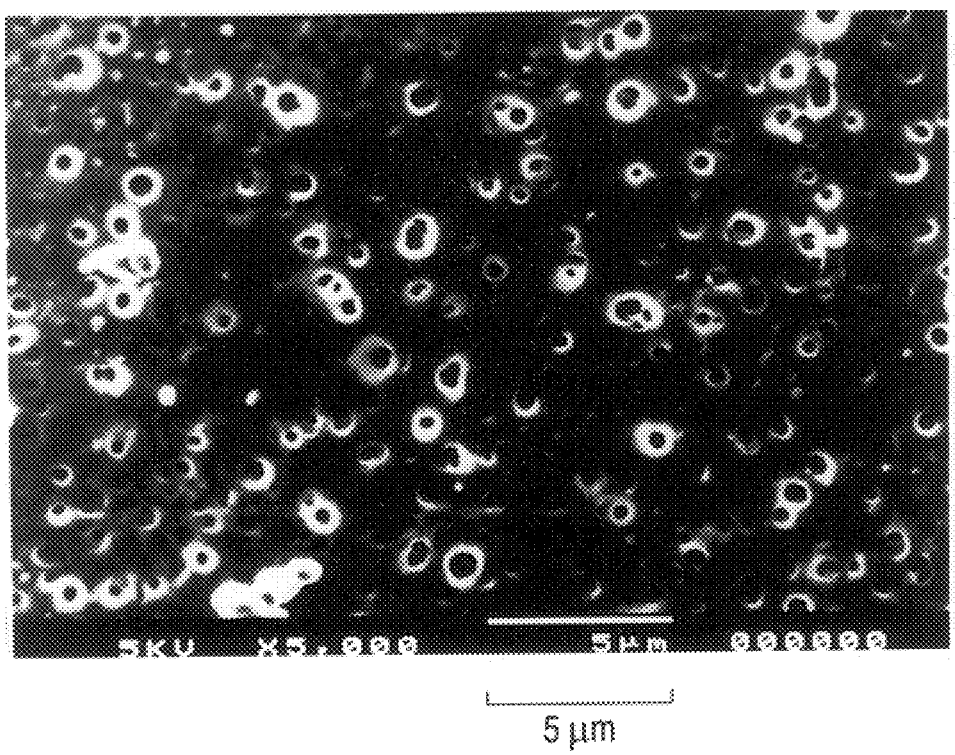
FIG. 3 is an electron microphotograph illustrating the surface conditions of a further ion exchange resin having pores according to the present invention.

These coated materials were then immediately soaked in n-butyl acetate for 15 minutes. Subsequently, these coated materials were withdrawn to the atmosphere where they were then allowed to dry at room temperature. As a result, a Nafion resin (ion exchange resin) membrane having pores was formed on the glass plate. The ion exchange resin membranes having pores prepared from the 9 wt-%, 13 wt-% and 21 wt-% Nafion solutions will be hereinafter referred to as "Porous membrane A", "Porous membrane B", and "Porous membrane C", respectively. The diagram (electron microphotograph) illustrating the surface conditions of Porous membranes A, B and C are shown in FIGS. 1, 2 and 3, respectively. Porous membranes A, B and C exhibited a porosity of 90%, 70% and 40%, respectively.

For comparison, the foregoing 9 wt-%, 13 wt-% and 21 wt-% Nafion solutions were applied to a glass plate through a screen or by using a doctor blade in the same manner as mentioned above, and then directly allowed to dry at room temperature to form a membrane on the glass plate. The ion exchange resin membranes having pores prepared from the 9 wt-%, 13 wt-% and 21 wt-% Nafion solutions will be hereinafter referred to as "Comparative membrane A", "Comparative membrane B", and "Comparative membrane C", respectively.

Porous membranes A, B and C and Comparative membranes A, B and C were then measured for conductance in the following manner.

The six samples, i.e., Porous membranes A, B and C and Comparative membranes A, B and C were each cut into a size of 1.5 cm wide×3.5 cm long. These samples were each soaked in a 0.5 mol/l diluted sulfuric acid overnight, and then thoroughly washed with purified water to give protonic type samples. The protonation treatment and the measurement of conductance were conducted with these samples integrated with the glass plate. During the measurement of conductance, these samples were soaked in purified water having a conductance of not more than 0.2 μS/cm at a temperature of 25° C. In this arrangement, these porous membranes and comparative membranes were each measured for conductance along the surface thereof.

For the measurement of conductance, a dc four-terminal current interrupter method was employed. In some detail, as the voltage measurement terminal and the current introduction terminal there were each used a platinum wire having a diameter of 1 mm. The gap between the voltage measurement terminals was 5 mm. The gap between the current introduction terminals was 15 mm. A DC pulse current was applied to the current introduction terminal. The change of voltage developed between the voltage measurement terminals was then measured by an oscilloscope. From the predetermined current and the voltage change thus measured, the resistivity of these films were then determined. From the resistivity and the thickness of the membrane, conductance was calculated.

Table 1 shows the conductance of Comparative membranes A, B and C. All the comparative membranes exhibited a conductance of about 0.1 S/cm.

TABLE 1

Conductance of Comparative membranes A, B and C

| | Conductance S/cm |
|---|---|
| Comparative membrane A | 0.098 |
| Comparative membrane B | 0.100 |
| Comparative membrane C | 0.103 |

Table 2 shows the porosity and conductance of Porous membranes A, B and C.

In general, when pores are formed in a conductor, the amount of the conductor per unit sectional area perpendicular to the direction of conduction is decreased, lowering the conductance of the conductor. For example, a conductor having a porosity of 50% has a density of ½ per unit sectional area and hence an apparent conductance of ½ of that of the ion exchange resin free of pores. In other words, an ion exchange resin having a porosity of 40% exhibits an apparent conductance of 60% of that of an ion exchange resin free of pores and a conductance of 0.06 S/cm.

However, as can be seen in Tables 1 and 2, even an ion exchange resin having pores formed therein exhibits a conductance equal to or higher than that of an ion exchange resin having no pores formed therein. The correction of porosity shows that the conductance of the ion exchange resin is enhanced by 50% or more. The details of this mechanism are unknown. It is known that the protonic conductance of an ion exchange resin depends on the water content of the ion exchange resin. The specific phenomenon of conductance of the ion exchange resin having pores is presumably attributed to the rise in the surface area of the ion exchange resin and the area of the ion exchange resin in contact with water caused by the porosity of the ion exchange resin.

As mentioned above, the formation of pores in an ion exchange resin which is a constituent and covering material of the catalyst layer provided unexpected results that enhancement is given in not only gas permeability but also protonic conductance.

TABLE 2

Porosity and conductance of Porous membrane A, B and C

| | Porosity % | Conductance S/cm |
|---|---|---|
| Porous membrane A | 90 | 0.070 |
| Porous membrane B | 70 | 0.100 |
| Porous membrane C | 40 | 0.112 |

EXAMPLE 1

Figure 6:
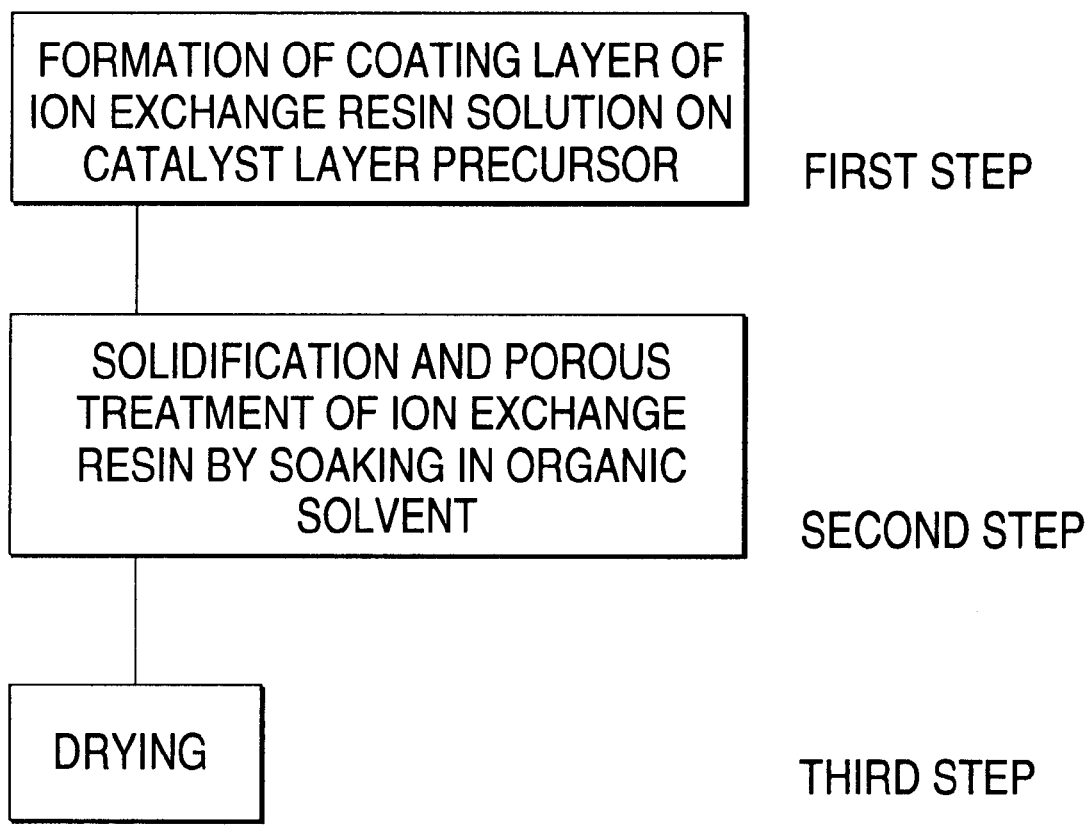
FIG. 6 is a chart illustrating the process for the preparation of a gas diffusion electrode comprising a catalyst layer provided with an ion exchange resin having pores according to the present invention.

The present invention will be further described in connection with FIG. 6 illustrating a production process according to a first example of the present invention.

At the first step, a coating film is formed on a previously prepared catalyst layer precursor from an ion exchange resin solution. The formation of the coating film was carried out by coating.

At the second step, the catalyst layer precursor is soaked in an organic solvent having a polar group other than alcoholic hydroxyl group before the ion exchange resin solution with which it had been impregnated at the first step was dried. During this procedure, the covering ion exchange resin solution was solidified and rendered porous.

At the third step, the catalyst layer precursor was allowed to dry at room temperature to obtain a gas diffusion electrode provided in a catalyst layer with an ion exchange resin having pores.

A process for the preparation of the gas diffusion electrode according to the present invention and the electrode assembly comprising same will be described in detail.

At the foregoing first step, as the ion exchange resin solution there was used a 9 wt-% Nafion solution obtained by heating and concentrating "5 wt-% Nafion solution", which is a trade name of Aldrich Chemical Inc. of USA, at 60° C.

The catalyst layer precursor was prepared by applying to a water repellent carbon paper a pasty aqueous mixture prepared by adding a polytetrafluoroethylene (PTFE) to a carbon-supported platinum catalyst having 30 wt-% platinum supported therein in an amount of 30 wt-%, and then drying the coated material. The gas diffusion electrode thus prepared had a size of 5 cm×5 cm and a platinum content of 0.5 mg/cm$^2$.

The catalyst layer precursor thus prepared was coated with a 9 wt-% Nafion solution. The coated amount was about 0.5 mg/cm$^2$ as calculated in terms of dried solid content of Nafion.

At the second step, as the organic solvent having a polar group other than alcoholic hydroxyl group there was used n-butyl acetate. The catalyst layer precursor thus coated with Nafion solution was immediately soaked in n-butyl acetate where it was then allowed to stand.

Figure 7:
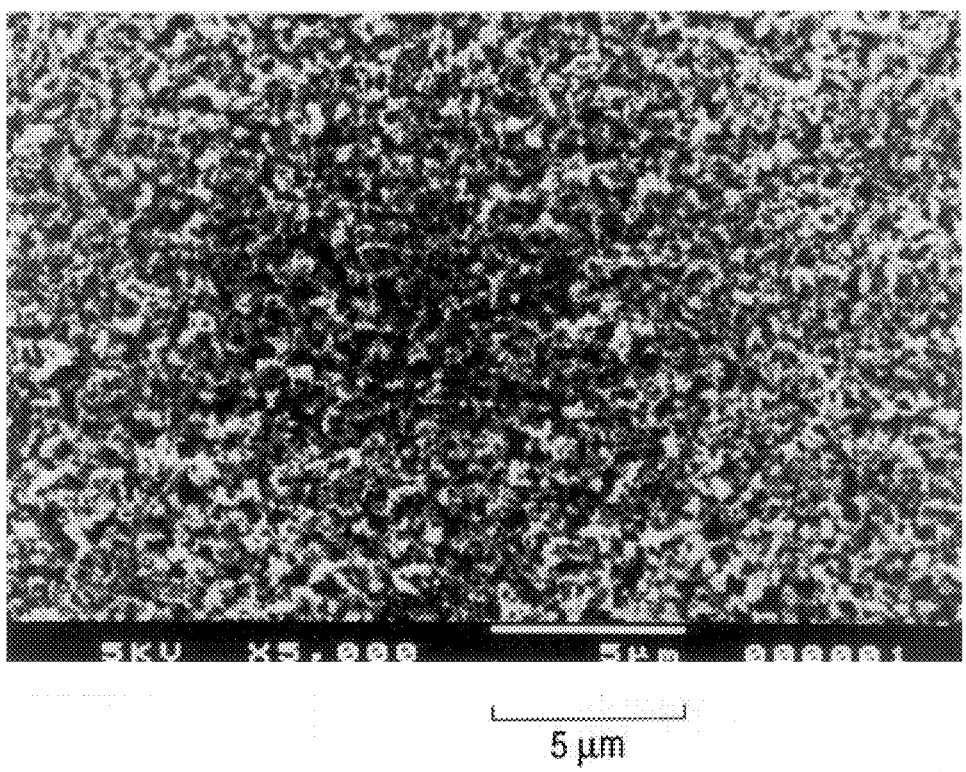
FIG. 7 is an electron microphotograph illustrating the surface conditions of a catalyst layer in a gas diffusion electrode provided with an ion exchange resin having pores according to the present invention.

At the subsequent third step, the catalyst layer precursor was withdrawn from n-butyl acetate, and then thoroughly allowed to dry at room temperature. Thus, a gas diffusion electrode provided in a catalyst layer with an ion exchange resin having pores of the present invention was prepared. The gas diffusion electrode thus prepared will be hereinafter referred to as "gas diffusion electrode A". The diagram (electron micrograph) illustrating the surface conditions of the catalyst layer in the gas diffusion electrode A is shown in FIG. 7. The black portion indicates a carbon-supported platinum catalyst while the white portion indicates an ion exchange resin having pores.

The solid polymer electrolyte membrane was pressed interposed between two sheets of the gas diffusion electrodes A at a temperature of 130° C. under a pressure of 50 kg/cm$^2$ for 2 minutes to obtain an electrode assembly A. As the solid polymer electrolyte membrane there was used Nafion 115, which is a trade name of Du Pont Inc. of USA.

A solid polymer electrolyte fuel cell A (hereinafter simply referred to as "cell A") was prepared from the electrode assembly A.

EXAMPLE 2

A gas diffusion electrode was prepared from a 13 wt-% Nafion solution prepared from a commercially available 5 wt-% Nafion solution and the catalyst layer precursor prepared in Example 1 in the same manner as in Example 1. The amount of the platinum catalyst and Nafion incorporated in the catalyst layer was the same as in the gas diffusion electrode A prepared in Example 1. The gas diffusion electrode thus prepared will be hereinafter referred as "gas diffusion electrode B" according to the present invention.

The gas diffusion electrode B was then bonded to both sides of Nafion 115 membrane, which is a trade name of Du Pont Inc. of USA, as a solid polymer electrolyte membrane in the same manner as in Example 1 to prepare an electrode assembly B. The bonding was carried out by pressing the combination at a temperature of 130° C. under a pressure of 50 kg/cm$^2$ for 2 minutes in the same manner as in Example 1.

A solid polymer electrolyte fuel cell B (hereinafter simply referred to as "cell B") was prepared from the electrode assembly B.

EXAMPLE 3

A gas diffusion electrode was prepared from a 21 wt-% Nafion solution prepared from a commercially available 5 wt-% Nafion solution and the catalyst layer precursor prepared in Example 1 in the same manner as in Example 1. The amount of the platinum catalyst and Nafion incorporated in the catalyst layer was the same as in the gas diffusion electrode A prepared in Example 1. The gas diffusion electrode thus prepared will be hereinafter referred as "gas diffusion electrode C" according to the present invention.

The gas diffusion electrode C was then bonded to both sides of Nafion 115 membrane, which is a trade name of Du Pont Inc. of USA, as a solid polymer electrolyte membrane in the same manner as in Example 1 to prepare an electrode assembly C. The bonding was carried out by pressing the combination at a temperature of 130° C. under a pressure of 50 kg/cm$^2$ for 2 minutes in the same manner as in Example 1.

A solid polymer electrolyte fuel cell C (hereinafter simply referred to as "cell C") was prepared from the electrode assembly C.

The gas diffusion electrodes A, B and C had different concentrations of covering Nafion solution and hence different diameters of pores in the ion exchange resin constituting the catalyst layer. The results of observation of surface conditions by an electron microscope show that these pore diameters are almost the same as that of pores in the porous film prepared from Nafion solutions having various concentrations shown in Experiment 1. In other words, the ion exchange resin having pores constituting the catalyst layer in these gas diffusion electrodes had a pore diameter of from 0.02 to 5.0 μm and a porosity of not less than 40%.

EXAMPLE 4

A production process according to the fourth example of the present invention will be described hereinafter.

At the first step, an ion exchange resin and a polymer compound incompatible therewith (hereinafter referred to as "second polymer compound") were dissolved in an organic solvent capable of dissolving the polymer compound therein to prepare a second polymer compound solution.

At the second step, the ion exchange resin solution and the second polymer compound solution were mixed with thorough stirring to prepare a mixed dispersion.

At the third step, the catalyst layer in a gas diffusion electrode comprising a catalyst layer free of ion exchange resin and a gas diffusion layer which had been previously prepared was provided with the previously mentioned mixed dispersion.

At the fourth step, the gas diffusion electrode having its catalyst layer provided with the previously mentioned mixed dispersion was dried to remove the solvent from the mixed dispersion. Thus, a film having the ion exchange resin present incompatible with the second polymer compound or having the second polymer compound dispersed in the ion exchange resin was formed.

At the fifth step, the second polymer compound dispersed in the ion exchange resin was eluted with a solvent capable of dissolving only the second polymer compound therein to remove the second polymer compound from the ion exchange resin film.

At the sixth step, the previously mentioned gas diffusion electrode was dried to form an ion exchange resin film having pores on the catalyst layer.

At the foregoing first step, a 0.5 wt-% THF solution of PVC was prepared from tetrahydrofuran (hereinafter referred to as "THF") as a solvent and a polyvinyl chloride (hereinafter referred to as "PVC") as a second polymer compound.

At the foregoing second step, as the ion exchange resin solution there was used a "5% Nafion solution", which is a trade name of Aldrich Chemical Inc. of USA. The 5% Nafion solution and the 0.5 wt-% THF solution of PVC prepared at the first step were measured out in the same amount, and then mixed with thorough stirring to prepare an opaque mixed dispersion.

At the foregoing third step, the foregoing opaque mixed dispersion was applied to the same catalyst layer as prepared in Example 1. The coated amount was about 0.5 mg/cm$^2$ as calculated in terms of dried solid content of Nafion.

At the foregoing fourth step, the gas diffusion electrode having its catalyst layer provided with the previously mentioned mixed dispersion was kept at a temperature of 60° C. for 12 hours to sufficient dryness.

At the foregoing fifth step, the foregoing dried gas diffusion electrode was soaked in THF for 4 hours during which PVC was eluted while being permeated by THF.

At the foregoing sixth step, the foregoing gas diffusion electrode from which PVC had been eluted was dried. The gas diffusion electrode thus prepared will be hereinafter referred to as "gas diffusion electrode D" according to the present invention. The gas diffusion electrode D was then bonded to a solid polymer electrolyte membrane to obtain an electrode assembly D. As the solid polymer electrolyte membrane there was used Nafion 115, which is a trade name of Du Pont Inc. of USA. In some detail, the ion exchange resin membrane was pressed interposed between two sheets of the gas diffusion electrodes D at a temperature of 130° C. under a pressure of 50 kg/cm$^2$ for 2 minutes so that the gas diffusion electrode was bonded to both sides of the ion exchange resin membrane.

A solid polymer electrolyte fuel cell D (hereinafter simply referred to as "cell D") was prepared from the electrode assembly D.

Comparative Example 1

A mixture of a carbon-supported platinum catalyst having 30% of platinum supported thereon, a polytetrafluoroethylene and a 5% Nafion solution was prepared. The mixture thus prepared was then applied to a carbon paper rendered water repellent by PTFE to prepare a gas diffusion electrode. The structure of the gas diffusion electrode was prepared as to have the same composition as in Example 1. The applied amount of platinum was 0.5 mg/cm$^2$, and the applied amount of Nafion was 0.5 mg/cm$^2$. The prior art gas diffusion electrode thus prepared will be hereinafter referred to as "gas diffusion electrode E".

The gas diffusion electrode E was then bonded to a solid polymer electrolyte membrane to obtain an electrode assembly E. As the solid polymer electrolyte membrane there was used Nafion 115, which is a trade name of Du Pont Inc. of USA. In some detail, the ion exchange resin membrane was pressed interposed between two sheets of the gas diffusion electrodes E at a temperature of 130° C. under a pressure of 50 kg/cm$^2$ for 2 minutes so that the gas diffusion electrode was bonded to both sides of the ion exchange resin membrane.

A solid polymer electrolyte fuel cell E (hereinafter simply referred to as "cell E") was prepared from the electrode assembly E.

(Experiment 2)

Hydrogen gas as fuel gas and oxygen gas as oxidizing gas were supplied into the cells A, B, C and D according to the present invention and the comparative cell E at the atmosphere. In this manner, these cells were measured for current density-cell voltage characteristics. The operating conditions will be given below.

Operating temperature: 80° C.

Oxygen humidity temperature: 75° C.

Hydrogen humidity temperature: 75° C.

Percent use of oxygen: 50%

Percent use of hydrogen: 70%

Figure 8:
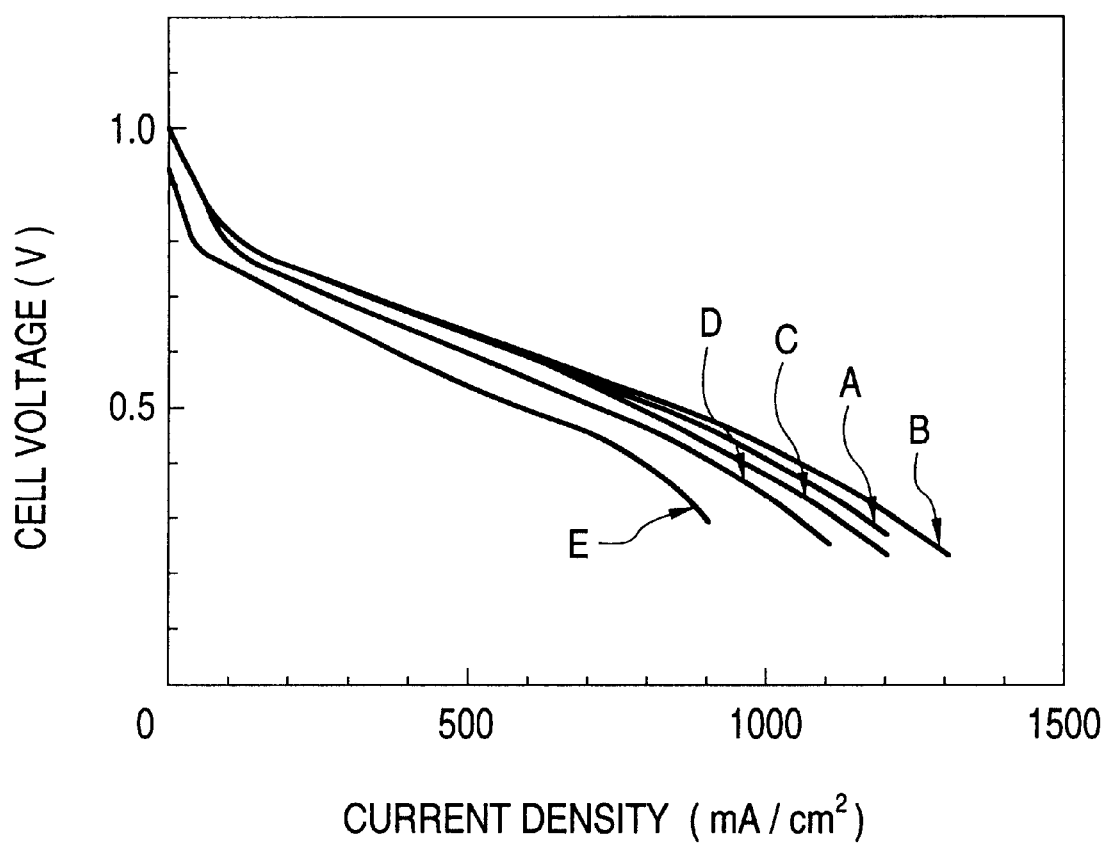
FIG. 8 is a graph illustrating the current density-cell voltage characteristic curve of cells A, B, C and D according to the present invention and a prior art known cell E.

FIG. 8 illustrates the cell voltage-current density characteristic curve of the cells A, B, C and D according to the present invention and the comparative cell E. As can be seen in FIG. 8, the cells A, B, C and D comprising a gas diffusion electrode provided with a catalyst layer having pores exhibit a smaller cell voltage drop at a high current density than the comparative cell E provided with the comparative ion exchange resin free of pores and hence excellent polarization characteristics.

It was also made obvious that by covering a catalyst layer by an ion exchange resin having pores, the resulting gas diffusion electrode and solid polymer electrolyte fuel cell comprising same exhibit remarkable improvement in characteristics over the prior art known products. It was thus confirmed that the provision of the catalyst layer with the ion exchange resin having pores exerts an effect of enhancing the power of the solid polymer electrolyte fuel cell.

EXAMPLE 5

A process for the production of a solid polymer electrolyte membrane provided with pores according to the present invention will be described hereinafter.

At the first step, the concentration of a solution of an ion exchange resin in a solvent containing an alcohol was adjusted.

At the second step, the ion exchange resin solution the concentration of which had been adjusted at the previous step was applied to a membrane-forming material having an excellent releasability.

At the third step, the membrane-forming material coated with an ion exchange resin was soaked in an organic solvent having a polar group other than alcoholic hydroxyl group so that the ion exchange resin was solidified and rendered porous.

At the fourth step, the membrane-forming material was withdrawn from the organic solvent used at the previous step, and then dried.

A process for the preparation of a solid polymer electrolyte membrane having pores according to the present invention and a solid polymer electrolyte fuel cell comprising same will be described in detail hereinafter.

At the foregoing first step, a 31 wt-% Nafion solution was prepared by heating and concentrating a 5 wt-% Nafion solution, which is a trade name of Aldrich Chemical Inc. of USA, as an ion exchange resin solution at a temperature of 60° C.

At the foregoing second step, as the membrane-forming material having an excellent releasability there was used a fluorinic polymer compound sheet. This sheet was disposed on a flat surface such as on a glass plate during use. For coating, a doctor blade with its gap adjusted to 0.15 mm was used. In this manner, the 31 wt-% Nafion solution was applied to the membrane-forming material.

At the foregoing third step, the membrane-forming material thus coated with the Nafion solution was immediately soaked in n-butyl acetate as an organic solvent having a polar group other than alcoholic hydroxyl group where it was then allowed to stand for 20 minutes.

At the foregoing fourth step, the membrane-forming material was withdrawn from n-butyl acetate used at the previous step, and then allowed to dry at room temperature to obtain a solid polymer electrolyte membrane provided with pores. The solid polymer electrolyte membrane thus obtained will be hereinafter referred to as "membrane F".

The membrane F which is a solid polymer electrolyte membrane provided with pores had a thickness of 30 $\mu$m and a porosity of 10%. As a result of observation of surface conditions by an electron microscope, it was found that the membrane F had pores having a diameter of from 0.02 to 1.0 $\mu$m formed therein. The membrane F was measured for conductance in the same manner as in Experiment 1. The results were 0.115 S/cm.

A process for the preparation of a gas diffusion electrode-solid polymer electrolyte membrane assembly will be described hereinafter. As a gas diffusion electrode there was used the gas diffusion electrode B having a diameter of 1.5 cm according to the present invention prepared in Example 2. As a solid polymer electrolyte membrane there was used membrane F having a diameter of 3.0 cm. In some detail, the membrane F was pressed interposed between two sheets of the gas diffusion electrodes B at a temperature of 130° C. under a pressure of 50 kg/cm² for 2 minutes to prepare a gas diffusion electrode-solid polymer electrolyte membrane assembly. A solid polymer electrolyte fuel cell F (hereinafter simply referred to as "cell F") was then prepared from the gas diffusion electrode-solid polymer electrolyte membrane assembly.

Comparative Example 2

A 31 wt-% Nafion solution was applied to a membrane-forming material by means of a doctor blade with its gap adjusted to 0.18 mm in the same manner as in Example 5, and then directly allowed to dry to prepare a uniform solid polymer membrane. The solid polymer electrolyte membrane thus obtained will be hereinafter referred to as "membrane G".

The membrane G, which is a solid polymer electrolyte membrane provided with pores, had a thickness of 30 $\mu$m. The membrane G was measured for conductance in the same manner as in Experiment 1. The results were 0.101 S/cm.

As a gas diffusion electrode there was used the prior art known gas diffusion electrode E having a diameter of 1.5 cm prepared in Comparative Example 1. As a solid polymer electrolyte membrane there was used a membrane G having a diameter of 3.0 cm. In some detail, the membrane G was pressed interposed between two sheets of the gas diffusion electrodes E at a temperature of 130° C. under a pressure of 50 kg/cm² in the same manner as in Example 5 for 2 minutes. Thus, a gas diffusion electrode-solid polymer electrolyte membrane assembly was prepared. A comparative solid polymer electrolyte fuel cell G (hereinafter simply referred to as "cell G") was then prepared from the gas diffusion electrode-solid polymer electrolyte membrane assembly.

(Experiment 3)

The cells F and G were measured for cell voltage-current density characteristics in the same manner as in Experiment 2. As a result, the two cells showed almost the same characteristics. Further, the two cells were subjected to life test at a temperature of 60° C. As a result, the cell F according to the present invention exhibited better results. This is presumably because the solid polymer electrolyte membrane provided with an ion exchange resin having pores has a good water retention.

This result shows that the use of a solid polymer electrolyte membrane having pores makes it possible to form a solid polymer electrolyte fuel cell having a prolonged life. Further, the fact that the cell F can exhibit the same characteristics as the cell G despite its great thickness of ion exchange resin membrane also shows that the formation of pores in a solid polymer electrolyte membrane enhances the conductance of the solid polymer electrolyte fuel cell, making it possible to provide the resulting solid polymer electrolyte fuel cell with an enhanced output.

Industrial Applicability

As mentioned above, the gas diffusion electrode according to the present invention has pores in the catalyst layer, i.e., ion exchange resin by which the catalytic substance is covered, making it possible to prevent the carbon-supported platinum catalyst from being excessively covered. Further, since the pores are in the form of three-dimensional network structure, the resulting catalyst layer has a high permeability to oxygen or hydrogen, making it possible to facilitate the supply of a reaction gas to the catalytic substance. Moreover, since the ion exchange resin has a continuous three-dimensional network structure, a sufficient path of migration of proton can be formed. Further, the increase in the area of contact with water accompanying the increase in the surface area of the ion exchange resin by the porosity of the ion exchange resin makes it possible to enhance the conductance of the ion exchange resin.

Further, the production process according to the present invention allows the maintenance of electrical contact between the catalyst particles, making it possible to form a sufficient path of migration of electron. Moreover, the solid polymer electrolyte membrane according to the present invention exhibits a lowered resistivity and an improved water retention.

Accordingly, the resulting catalyst layer can be provided with a three-phase boundary also there inside while maintaining sufficient electron conductivity, capability of supplying reaction gas and proton conductance, making it possible to provide a solid polymer electrolyte membrane-gas diffusion electrode assembly having excellent polarization characteristics. In addition, a solid polymer electrolyte fuel cell having a high power density can be provided.

What is claimed is:

1. A gas diffusion electrode for a solid polymer electrolyte fuel cell comprising a gas diffusion layer and a catalyst layer, characterized in that said catalyst layer is provided with a catalytic substance, a binder, and voids which are formed in the structure formed by said catalytic substance and said binder, wherein said catalytic substance is provided with an ion exchange resin on the surface of said catalytic substance, wherein said ion exchange resin is of a network structure with continuous three dimensional pores.

2. The gas diffusion electrode for the solid polymer electrolyte fuel cell according to claim 1, wherein said ion exchange resin has pores having a diameter of from 0.05 $\mu$m to 5.0 $\mu$m and porosity of not less than 40%.

3. The gas diffusion electrode for the solid polymer electrolyte fuel cell according to claim 1 or 2, wherein said ion exchange resin is a perfluorosulfonic acid resin and said catalytic substance is a particulate noble metal or carbon having a particulate noble metal supported thereon.

4. The gas diffusion electrode for a solid polymer electrolyte fuel cell according to claim 1, wherein said ion exchange resin has a continuous three dimensional network structure.

5. A process for the production of a gas diffusion electrode for a solid polymer electrolyte fuel cell having a gas diffusion layer and a catalyst layer, characterized in that said catalyst layer is provided with a catalytic substance, a binder, and voids which are formed in the structure formed by said catalytic substance and said binder, wherein said catalytic substance is provided with an ion exchange resin on the surface of said catalytic substance, wherein said ion exchange resin is of a network structure with continuous three dimensional pores, which comprises forming an ion exchange resin coating film on a catalyst layer precursor comprising at least a catalytic substance from a solution obtained by dissolving an ion exchange resin in a solvent contained in alcohol, and then soaking the catalyst layer precursor with ion exchange resin coating film in organic solvent having a polar group, wherein said polar group is not an alcoholic hydroxyl group, so that the ion exchange resin solution is solidified and rendered porous.

6. The process for the production of a gas diffusion electrode for a solid polymer electrolyte fuel cell according to claim 5, wherein said ion exchange resin has a continuous three dimensional network structure.

7. A solid polymer electrolyte membrane-gas diffusion electrode assembly comprising a gas diffusion electrode for a solid polymer electrolyte fuel cell, provided on at least one side of a solid polymer electrolyte membrane, said gas diffusion electrode having a gas diffusion layer and a catalyst layer, said catalyst layer is provided with a catalytic substance, a binder, and voids which are formed in the structure formed by said catalytic substance and said binder, wherein said substance is provided with an ion exchange resin on the surface of said catalytic substance, wherein said ion exchange resin is of a network structure with continuous three dimensional pores.

8. The solid polymer electrolyte membrane-gas diffusion electrode assembly according to claim 7, wherein said ion exchange resin has a continuous three dimensional network structure.

9. A solid polymer electrolyte fuel cell comprising:

a solid polymer electrolyte membrane-gas diffusion electrode assembly having:
   a gas diffusion electrode for a solid polymer electrolyte fuel cell provided on at least one side of a solid polymer electrolyte membrane, said gas diffusion electrode having a gas diffusion layer and a catalyst layer, said catalyst layer is provided with a catalytic substance, a binder, and voids which are formed in the structure formed by said catalytic substance and said binder, wherein said catalytic substance is provided with an ion exchange resin on the surface of said catalytic substance, wherein said ion exchange resin is of a network structure with continuous three dimensional pores.

* * * * *